(12) United States Patent
Miura et al.

(10) Patent No.: US 7,280,839 B2
(45) Date of Patent: Oct. 9, 2007

(54) WIRELESS COMMUNICATION DEVICE HAVING GAIN ERROR CORRECTING FEATURE

(75) Inventors: Takashi Miura, Yokosuka (JP); Hidenori Matsumoto, Yokohama (JP); Toshio Obara, Kawasaki (JP)

(73) Assignees: Panasonic Mobile Communications Co., Ltd., Kanagawa (JP); NTT DoCoMo, Inc, Tokyo (JP)

( * ) Notice: Subject to any disclaimer, the term of this patent is extended or adjusted under 35 U.S.C. 154(b) by 216 days.

(21) Appl. No.: 10/531,051

(22) PCT Filed: Dec. 26, 2003

(86) PCT No.: PCT/JP03/17051

§ 371 (c)(1),
(2), (4) Date: Apr. 12, 2005

(87) PCT Pub. No.: WO2004/059885

PCT Pub. Date: Jul. 15, 2004

(65) Prior Publication Data

US 2006/0009163 A1    Jan. 12, 2006

(30) Foreign Application Priority Data

Dec. 26, 2002   (JP)   ............................. 2002-377204

(51) Int. Cl.
*H04Q 7/20*   (2006.01)

(52) U.S. Cl. ...................... 455/522; 455/127.2; 455/69; 375/295; 375/297

(58) Field of Classification Search ............. 455/127.1, 455/424, 425, 456.5, 456.6, 561, 550.1, 575.1, 455/13.4, 522, 63.1, 67.11, 69, 91, 95, 134, 455/135, 127.2, 126, 127.3, 232.1, 239.1–250.1; 375/200, 206, 250, 295, 205, 297, 302, 345, 375/298, 296, 340; 330/130, 133, 254, 256, 330/129, 278, 279, 140, 290, 149, 291, 292, 330/229, 284, 259, 144, 150, 151, 138; 370/318, 370/242, 252, 328, 335

See application file for complete search history.

(56) References Cited

U.S. PATENT DOCUMENTS 5,159,283 A * 10/1992 Jensen ........................ 330/129

(Continued)

FOREIGN PATENT DOCUMENTS

JP          11-308126          11/1999

(Continued)

*Primary Examiner*—Edward F. Urban
*Assistant Examiner*—Charles Chow
(74) *Attorney, Agent, or Firm*—Pearne & Gordon LLP

(57) ABSTRACT

It is an object of the present invention to suppress an abrupt gain change and smoothly and highly accurately control transmitted electric power even if the transmitted electric power greatly changes when a closed loop control that crosses the threshold value as the detection limit of the transmitted electric power.

The transmitted electric power of a self-station is detected to obtain an error between the detected transmitted electric power of the self-station and transmitted electric power set in accordance with a transmitted electric power control bit sent to the self-station from the other station. A buffer unit such as a transmitted electric power deciding part, an error integrating part or the like is provided for preventing the obtained error from greatly changing upon great change of the transmitted electric power when the transmitted electric power is controlled by crossing the threshold value as the detection limit of the transmitted electric power. Thus, an error when the gain of the variable gain amplifier is suppressed.

20 Claims, 8 Drawing Sheets

U.S. PATENT DOCUMENTS

| | | | |
|---|---|---|---|
| 5,548,616 A * | 8/1996 | Mucke et al. | 375/295 |
| 5,590,408 A * | 12/1996 | Weiland et al. | 455/69 |
| 5,732,334 A * | 3/1998 | Miyake | 455/126 |
| 5,771,461 A * | 6/1998 | Love et al. | 455/522 |
| 6,138,033 A * | 10/2000 | Kitade et al. | 455/522 |
| 6,252,455 B1 * | 6/2001 | Kurby et al. | 330/136 |
| 6,377,786 B2 * | 4/2002 | Mollenkopf et al. | 455/127.2 |
| 6,532,357 B1 * | 3/2003 | Ichikawa | 455/126 |
| 6,718,180 B1 * | 4/2004 | Lundh et al. | 455/522 |
| 6,819,938 B2 * | 11/2004 | Sahota | 455/522 |
| 7,031,677 B2 * | 4/2006 | Wenzel et al. | 455/127.2 |
| 7,155,251 B2 * | 12/2006 | Saruwatari et al. | 455/552.1 |
| 7,167,045 B1 * | 1/2007 | Son et al. | 330/130 |
| 2003/0231058 A1 * | 12/2003 | Ezuka | 330/149 |
| 2006/0189285 A1 * | 8/2006 | Takano et al. | 455/127.2 |

FOREIGN PATENT DOCUMENTS

| | | |
|---|---|---|
| JP | 2000-201089 | 7/2000 |
| JP | 2002-280958 | 9/2002 |

* cited by examiner

WIRELESS COMMUNICATION DEVICE HAVING GAIN ERROR CORRECTING FEATURE

TECHNICAL FIELD

The present invention relates to a radio communication device used in a mobile communication system that performs a mobile communication using a portable telephone or the like and more particularly to a technique for controlling the transmitted electric power of a transmitting system by a transmitted electric power control bit received from the other station.

BACKGROUND ART

In the mobile communication system, a transmitted electric power control technique has been usually known that transmitted electric power is controlled in accordance with a distance between a base station and a mobile station when information is transmitted to make the electric power of a signal received by the base station constant, suppress an interference between communication channels and improve a frequency using efficiency.

Especially, in a mobile communication system of a CDMA (Code Division Multiple Access) system using a spectrum diffusion technique for multiplexing a plurality of communication channels, the same frequency and the same time are shared between users. Accordingly, when the transmitted electric power from the mobile station is the same irrespective of a distance from the base station or a transmitting environment, a problem related to near or remote places undesirably arises that a signal from a near place is strong and a signal from a remote mobile station cannot be separated.

Therefore, to properly demodulate respective signal waves by an inverse diffusion in the base station, the receiving levels of the signal waves respectively need to be made uniform and a high electric power control is necessary in the mobile station. Specially, in the CDMA system, a wide dynamic range or a high linearity is required. Particularly, in the CDMA system of a broad band (W-CDMA or the like), the accuracy of transmitted electric power is highly required upon large electric power.

A usual radio communication device includes, as shown in FIG. 7, an antenna 1 for transmitting and receiving a radio signal and a transmit and receive separator 2 for separating a transmitting signal from a receiving signal. A receiving system comprises a radio receiving part 3 having a high frequency amplifying circuit for high-frequency amplifying the receiving signal and outputting an IF signal with a frequency converted to an IF (intermediate frequency) band, a local oscillating circuit and an IF signal amplifying circuit or the like, a demodulator 4 for converting the receiving signal to a base band signal and a base band signal processing part 5 for carrying out a signal process and a decoding process of the received base band signal.

Further, a transmitting system comprises the base band signal processing part 5 for carrying out a signal process and an encoding process of a transmitted base band signal, a modulator 13 for modulating the transmitting signal and outputting the IF signal and a radio transmitting part 14 for amplifying the electric power of the transmitting signal and converting a frequency to an RF (radio frequency) band. Further, the radio transmitting part 14 has a variable gain amplifier 15.

Further, in the radio communication device, a transmitted electric power control system includes the base band signal processing part 5, a transmitted electric power setting part 6 for receiving a transmitted electric power control bit outputted from the base band signal processing part 5 to set a transmitted electric power and an electric power value/gain control signal converting part 8 for converting a transmitted electric power setting value from the transmitted electric power setting part 6 to a gain control signal.

Further, a radio communication device having a transmitted electric power correcting function includes, as a transmitted electric power adjusting system, a transmitted electric power detecting part 9 for detecting transmitted electric power radiated from the antenna 1 to output a detecting signal, an error calculating part 10 for comparing the detecting signal with a gain control signal to calculate an error between the detecting signal and the gain control signal and output an error signal and an adding part 12 for adding the error signal to the gain control signal.

In the above-described usual structure, the transmitted electric power control bit is extracted on the basis of the base band signal obtained by demodulating the receiving signal to obtain the transmitted electric power setting value on the basis of the transmitted electric power control bit and convert the transmitted electric power setting value to the gain control signal A. On the other hand, the output value of the transmitted electric power radiated from the antenna 1 is detected. An error between the transmitted electric power instructed by the transmitted electric power control bit and actually transmitted electric power is detected as an error signal from the detecting signal corresponding to the transmitted electric power output value and the gain control signal A. This error signal is added to the gain control signal A to generate a gain control signal B. A transmitted electric power gain is controlled by the gain control signal B so that the error signal becomes zero in a closed loop. Thus, the accuracy of the transmitted electric power is improved. That is, the transmitted electric power setting value is compared with the transmitted electric power output value and the calculated error signal is added to the control signal so the feedback control of the transmitted electric power is carried out.

However, the detecting characteristics of a detecting diode of the transmitted electric power detecting part 9 show that the change of detecting voltage is small within a range in which the transmitted electric power is low as shown in FIG. 8. Accordingly, the transmitted electric power detecting part that meets a wide dynamic range necessary for the CDMA system is hardly realized. Accordingly, a control for operating a transmitted electric power control may be considered only upon large electric power that needs a high accuracy of the transmitted electric power. In the above-described usual technique, during the closed loop control that the transmitted electric power is relatively variably controlled, when a variable control exceeding the operating threshold value of a transmitted electric power control is carried out, the error signal (error voltage) outputted from the error calculating part abruptly changes. Therefore, an error is undesirably generated in a relative value and an accuracy of the transmitted electric power control is undesirably deteriorated.

The present invention is proposed to solve the above-described usual problems and it is an object of the present invention to provide a radio communication device that can suppress an abrupt gain change and smoothly and highly accurately control transmitted electric power even if the transmitted electric power crosses the threshold value to change when a closed loop control is performed to cross the threshold value as the detection limit of the transmitted electric power.

DISCLOSURE OF THE INVENTION

To achieve the above-described object, a radio communication device according to the present invention in which transmitted electric power is set in accordance with a transmitted electric power control bit sent to a self-station from the other station and the gain of a variable gain amplifier of a transmitting system is controlled so as to obtain the set transmitted electric power is characterized in that the radio communication device comprises: a transmitted electric power detecting part for detecting the transmitted electric power of the self-station; an error calculating part for obtaining an error between the detected transmitted electric power of the self-station and the set transmitted electric power; and a buffer unit for preventing the obtained error from greatly changing upon the change of the transmitted electric power over a threshold value when the transmitted electric power is controlled to cross the threshold value as the detection limit of the transmitted electric power of the transmitted electric power detecting part.

According to the present invention, the transmitted electric power of the self-station is detected to obtain the error between the detected transmitted electric power of the self-station and the transmitted electric power set in accordance with the transmitted electric power control bit sent to the self-station from the other station. The buffer unit prevents the obtained error from greatly changing upon the change of the transmitted electric power over the threshold value when the transmitted electric power is controlled to cross the threshold value as the detection limit of the transmitted electric power. Thus, an error generated when the gain of the variable gain amplifier is controlled suppressed. Here, in a first embodiment, the buffer unit corresponds to a transmitted electric power deciding part 7 and an error integrating part 11. In second to fourth embodiments, the buffer unit corresponds to a transmitted electric power deciding part 7, a switch part 17, an error deciding part 18 and an integrating part 19.

A radio communication device according to the present invention in which transmitted electric power is set in accordance with a transmitted electric power control bit sent to a self-station from the other station and the gain of a variable gain amplifier of a transmitting system is controlled so as to obtain the set transmitted electric power, characterized in that the radio communication device comprises: an electric power value/gain control signal converting part for converting the set transmitted electric power to a gain control signal of a form for controlling the gain of the variable gain amplifier; a transmitted electric power detecting part for detecting the transmitted electric power of the self-station; an error calculating part for comparing the detected transmitted electric power with the gain control signal to calculate an error between them; a transmitted electric power deciding part for deciding a large or a small value relative to the threshold value of the set transmitted electric power; an error integrating part that can switch whether or not the calculated error is integrated in accordance with the decided result of the large or the small value relative to the threshold value of the transmitted electric power; and an adding part for adding the integrated result to the gain control signal and controlling the gain of the variable gain amplifier by an obtained adding signal.

According to the present invention, the set transmitted electric power is converted to the gain control signal of the form for controlling the gain of the variable gain amplifier in accordance with the transmitted electric power control bit sent to the self-station from the other station. The transmitted electric power of the self-station is detected and the detected transmitted electric power is compared with the gain control signal to calculate the error (error signal) between them. The large value or the small value relative to the threshold value of the set transmitted electric power is decided. In accordance with the decided result, whether or not the error signal is integrated is switched. In other words, when the set transmitted electric power is larger than the threshold value, the error signal is integrated. The integrated result is added to the gain control signal. The gain of the variable gain amplifier is controlled by the obtained adding signal to control the transmitted electric power in a closed loop.

A radio communication device according to the present invention in which transmitted electric power is set in accordance with a transmitted electric power control bit sent to a self-station from the other station and the gain of a variable gain amplifier of a transmitting system is controlled so as to obtain the set transmitted electric power, characterized in that the radio communication device comprises: a transmitted electric power detecting part for detecting the transmitted electric power of the self-station; an error calculating part for comparing the value of the detected transmitted electric power with the set transmitted electric power to calculate an error; a transmitted electric power deciding part for deciding a large or a small value relative to the threshold value of the set transmitted electric power; a switch part for selecting and outputting any one of the calculated error and a below-described gain control correction value in accordance with the decided result of the large or the small value relative to the threshold value of the set transmitted electric power; an error deciding part for deciding whether or not an input signal from the switch part is located within a tolerance to output a correction value corresponding to the decided result; an integrating part for integrating the outputted correction value and outputting an integrated result as the gain control correction value; an adding part for adding the set transmitted electric power to the gain control correction value; and an electric power value/gain control signal converting part for converting the added result to a gain control signal of a form for controlling the gain of the variable gain amplifier and outputting the gain control signal to the variable gain amplifier.

According to the present invention, the transmitted electric power of the self-station is detected. The value of the detected transmitted electric power is compared with the transmitted electric power set in accordance with the transmitted electric power control bit sent to the self-station from the other station to calculate the error. The large value or the small value relative to the threshold value of the set transmitted electric power is decided. Any one of the calculated error and the gain control correction value is selected in accordance with the decided result of the large or the small value relative to the threshold value of the transmitted electric power. It is decided whether or not the selected signal is located within the tolerance to output the correction value corresponding to the decided result. The outputted correction value is integrated to obtain the gain control correction value. The gain control correction value is added to the set transmitted electric power. The added result is converted to the gain control signal of the form for controlling the gain of the variable gain amplifier and the gain control signal is outputted to the variable gain amplifier to control the transmitted electric power. That is, when the set transmitted electric power is larger than the threshold value, the calculated error signal is integrated. The integrated result is added to the set transmitted electric power. The gain of the variable gain amplifier is controlled by the obtained adding signal to control the transmitted electric power in a closed loop.

A radio communication device according to the present invention in which transmitted electric power is set in accordance with a transmitted electric power control bit sent to a self-station from the other station and the gain of a variable gain amplifier of a transmitting system is controlled so as to obtain the set transmitted electric power, characterized in that the radio communication device comprises: a transmitted electric power detecting part for detecting the transmitted electric power of the self-station; an error calculating part for comparing the value of the detected transmitted electric power with the set transmitted electric power to calculate an error; a transmitted electric power deciding part for deciding a large or a small value relative to the threshold value of the set transmitted electric power; a switch part for selecting and outputting any one of the calculated error and a below-described gain control correction value in accordance with the decided result of the large or the small value relative to the threshold value of the set transmitted electric power; an error deciding part for deciding whether or not an input signal from the switch part is located within a tolerance to output a correction value corresponding to the decided result; an integrating part for integrating the outputted correction value to output the gain control correction value; a first electric power value/gain control signal converting part for converting the gain control correction value to a gain control correction signal of a form for controlling the gain of the variable gain amplifier; a second electric power value/gain control signal converting part for converting the set transmitted electric power to a gain control signal of a form for controlling the gain of the variable gain amplifier; and an adding part for adding the gain control signal to the gain control correction signal and controlling the gain of the variable gain amplifier by an obtained adding signal.

According to the present invention, the transmitted electric power of the self-station is detected. The value of the detected transmitted electric power is compared with the transmitted electric power set in accordance with the transmitted electric power control bit sent to the self-station from the other station to calculate the error. The large value or the small value relative to the threshold value of the set transmitted electric power is decided. Any one of the calculated error and the gain control correction value is selected in accordance with the decided result of the large or the small value relative to the threshold value of the transmitted electric power. It is decided whether or not the selected signal is located within the tolerance to output the correction value corresponding to the decided result. The outputted correction value is integrated to obtain the gain control correction value. The gain control correction value is converted to the gain control correction signal of the form for controlling the gain of the variable gain amplifier. The set transmitted electric power is converted to the gain control signal of the form for controlling the gain of the variable gain amplifier. The gain control signal is added to the gain control correction signal to control the gain of the variable gain amplifier and control the transmitted electric power by the obtained adding signal. That is, when the set transmitted electric power is larger than the threshold value, the calculated error signal is integrated. The integrated result is added to the set transmitted electric power. The gain of the variable gain amplifier is controlled by the obtained adding signal to control the transmitted electric power in a closed loop.

A radio communication device according to the present invention in which transmitted electric power is set in accordance with a transmitted electric power control bit sent to a self-station from the other station and the gain of a variable gain amplifier of a transmitting system is controlled so as to obtain the set transmitted electric power, characterized in that the radio communication device comprises: a transmitted electric power detecting part for detecting the transmitted electric power of the self-station; an error calculating part for comparing the value of the detected transmitted electric power with the set transmitted electric power to calculate an error; a transmitted electric power deciding part for deciding a large or a small value relative to the threshold value of the set transmitted electric power; a switch part for selecting and outputting any one of the calculated error and a below-described gain control correction value in accordance with the decided result of the large or the small value relative to the threshold value of the set transmitted electric power; an error deciding part for deciding whether or not an input signal from the switch part is located within a tolerance and outputting a correction value corresponding to the decided result; an integrating part for integrating the outputted correction value to output the gain control correction value; an adding part for adding the set transmitted electric power to the gain control correction value; first and second electric power value/gain control signal converting parts for converting the added result to a gain control signal for controlling the gain of the variable gain amplifier; and a set value deciding part after correction for deciding by which of the first and second electric power value/gain control signal converting parts the added result is converted to the gain control signal in accordance with the large or the small value relative to the threshold value for deciding the level of the set transmitted electric power.

According to the present invention, the transmitted electric power of the self-station is detected. The value of the detected transmitted electric power is compared with the transmitted electric power set in accordance with the transmitted electric power control bit sent to the self-station from the other station to calculate the error. The large value or the small value relative to the threshold value of the set transmitted electric power is decided. Any one of the calculated error and the gain control correction value is selected in accordance with the decided result of the large or the small value relative to the threshold value of the transmitted electric power. It is decided whether or not the selected signal is located within the tolerance to output the correction value corresponding to the decided result. The outputted correction value is integrated to obtain the gain control correction value. The gain control correction value is added to the set transmitted electric power. The added result is converted to the gain control signal of the form for controlling the gain of the variable gain amplifier by either of the first and second electric power value/gain control signal converting parts in accordance with the large or the small value relative to the threshold value for deciding the level of the set transmitted electric power. The gain control signal is outputted to the variable gain amplifier to control the transmitted electric power. That is, when the set transmitted electric power is larger than the threshold value, the calculated error signal is integrated. The integrated result is added to the set transmitted electric power. The gain of the variable gain amplifier is controlled by the obtained adding signal to control the transmitted electric power in a closed loop.

A radio communication device according to the present invention is characterized in that the on/off control of the transmitted electric power detecting part or the error calculating part is carried out in accordance with the decided result of the large value or the small value relative to the threshold value of the transmitted electric power of the transmitted electric power deciding part.

According to the present invention, for instance, the transmitted electric power is not controlled in the closed loop, the transmitted electric power detecting part or the error calculating part is turned off.

Figure 1:
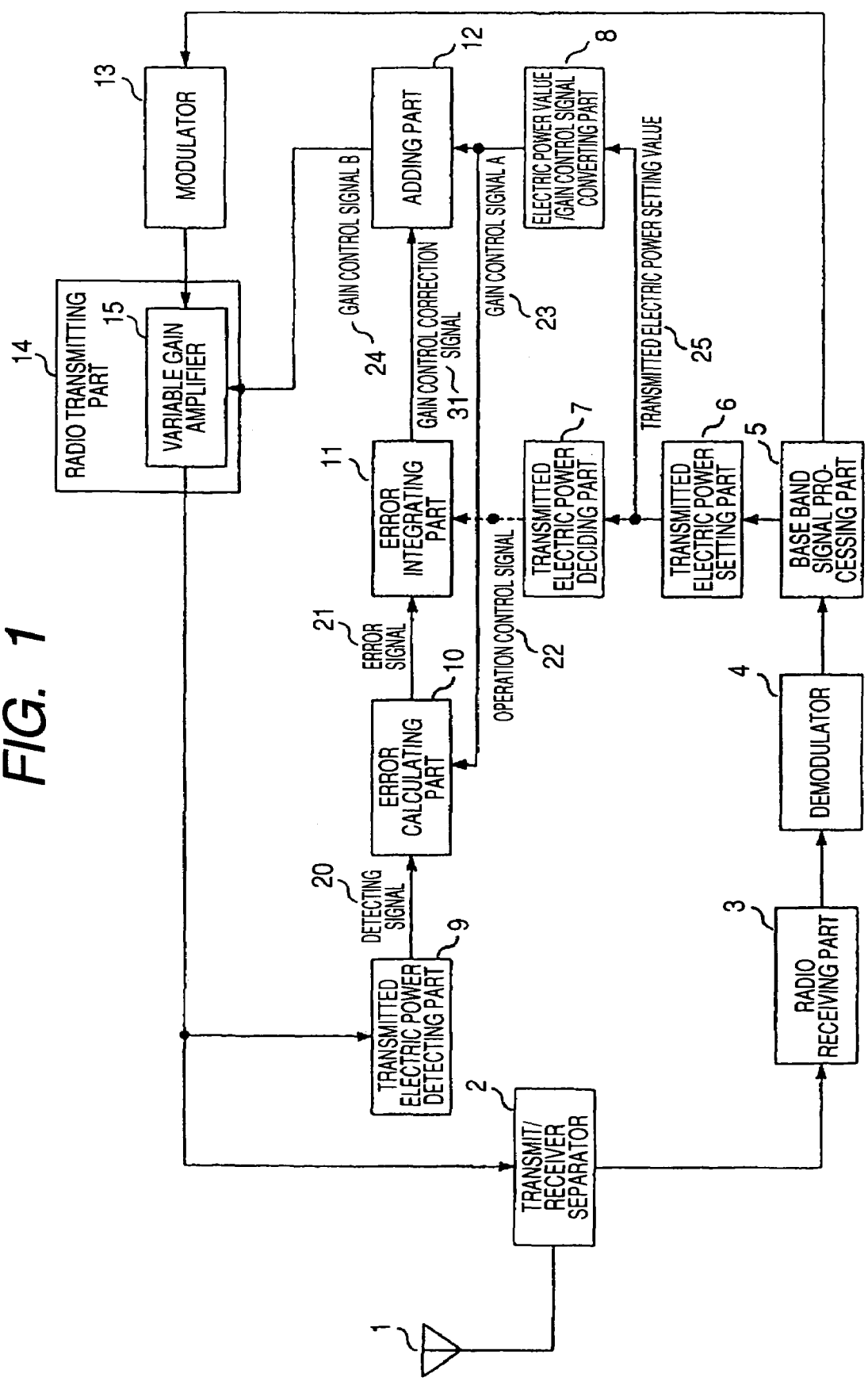
FIG. 1 is a block diagram showing a structural example of a radio communication device according to a first embodiment of the present invention.

Reference numeral 1 in the drawings designates an antenna, 2 designates a transmit/receive separator, 3 designates a radio receiving part, 4 designates a demodulator, 5 designates a base band signal processing part, 6 designates a transmitted electric power setting part, 7 designates a transmitted electric power deciding part, 8, 8a, 8b, 8c and 8d designate electric power value/gain control signal converting parts, 9 designates a transmitted electric power detecting part, 10 designates an error calculating part, 11 designates an error integrating part, 12 designates an adding part, 13 designates a modulator, 14 designates a radio transmitting part, 15 designates a variable gain amplifier, 16 designates a detecting signal/electric power value converting part, 17 designates a switch part, 18 designates an error deciding part, 19 designates an integrating part and 32 designates a set value deciding part after correction.

BEST MODE FOR CARRYING OUT THE INVENTION

Now, embodiments of the present invention will be described in detail by referring to the drawings. FIG. 1 is a block diagram showing a structural example of a radio communication device according to a first embodiment of the present invention. The radio communication device includes an antenna 1 for transmitting and receiving a radio signal and a transmit/receive separator 2 for separating a transmitting signal from a receiving signal. Further, the radio communication device includes, as a receiving system, a radio receiving part 3 having a high frequency amplifying circuit for high-frequency amplifying the receiving signal and outputting an IF signal with frequency converted to an IF (intermediate frequency) band, a local oscillating circuit and an IF signal amplifying circuit or the like, a demodulator 4 for converting the receiving signal to a base band signal and a base band signal processing part 5 for performing a signal process and a decoding process of the received base band signal.

Further, as a transmitting system, the radio communication device includes the base band signal processing part (used commonly for the receiving system) 5 for performing a signal process and an encoding process of a transmitted base band signal, a modulator 13 for modulating the transmitting signal to output the IF signal and a radio transmitting part 14 for amplifying the electric power of the transmitting signal and converting a frequency to an RF (radio frequency) band. Further, the radio transmitting part 14 includes a variable gain amplifier 15.

Further, the radio communication device of this embodiment includes, as a transmitted electric power control system, the base band signal processing part 5, a transmitted electric power setting part 6 for receiving a transmitted electric power control bit outputted from the base band signal processing part 5 to set transmitted electric power and an electric power value/gain control signal converting part 8 for converting an electric power setting value 25 from the transmitted electric power setting part 6 to a gain control signal A 23.

The radio communication device of this embodiment has a transmitted electric power correcting function and includes, as a transmitted electric power adjusting system, a transmitted electric power detecting part 9 for detecting the transmitted electric power radiated from the antenna 1 to output a detecting signal 20 corresponding thereto, an error calculating part 10 for comparing the detecting signal 20 with the gain control signal A23 to calculate an error between them and output an obtained error signal 21, a transmitted electric power deciding part 7 for deciding a relation of a large or a small value relative to the threshold value of the transmitted electric power setting value 25 to output an operation control signal 22 corresponding to the decided result, an error integrating part 11 for taking the error signal 21 as an input signal, switching whether the input signal is not inputted (opened) or inputted (short-circuited) by the operation control signal 22 and integrating the input signal to generate a gain control correction signal 31 when the input signal is inputted or outputting a stored integrating signal as the gain control correction signal 31 and an adding part 12 for adding the gain control correction signal 31 to the gain control signal A23.

Now, an operation of the radio communication device of this embodiment will be described below. A signal transmitted from a base station (not shown) is received by the antenna 1. The receiving signal is inputted to the radio receiving part 3 via the transmit/receive separator 2. The receiving signal inputted to the radio receiving part 3 whose frequency is converted to the IF band is converted to the base band signal by the demodulating part 4. Then, the base band signal is inputted to the base band signal processing part 5.

The base band signal processing part 5 extracts the transmitted electric power control bit based on the base band signal. The transmitted electric power setting part 6 receives the transmitted electric power control bit from the base band processing part 5 to output the transmitted electric power setting value 25 to the transmitted electric power deciding part 7 and the electric power value/gain control signal converting part 8. The transmitted electric power setting value 25 is converted to the gain control signal A23 in the electric power value/gain control signal converting part 8. Further, the transmitting signal is modulated by the modulator 13 to have the IF signal. The transmitting signal whose frequency is converted to the RF band and amplified by the radio transmitting part 14 is transmitted from the antenna 1 via the transmit/receive separator 2.

At this time, the transmitted electric power is detected by the transmitted electric power detecting power part 9 and inputted to the error calculating part 10 as the detecting signal 20. In the error calculating part 10, an error from the set transmitted electric power of the transmitted electric power is calculated from the inputted detecting signal 20 and the gain control voltage A23 to output the error signal 21. At this time, the transmitted electric power deciding part 7 decides a large or a small value relative to the threshold value of the transmitted electric power setting value 25 to output the operation control signal 22 based on the decided result to the error integrating part 11.

Figure 2:
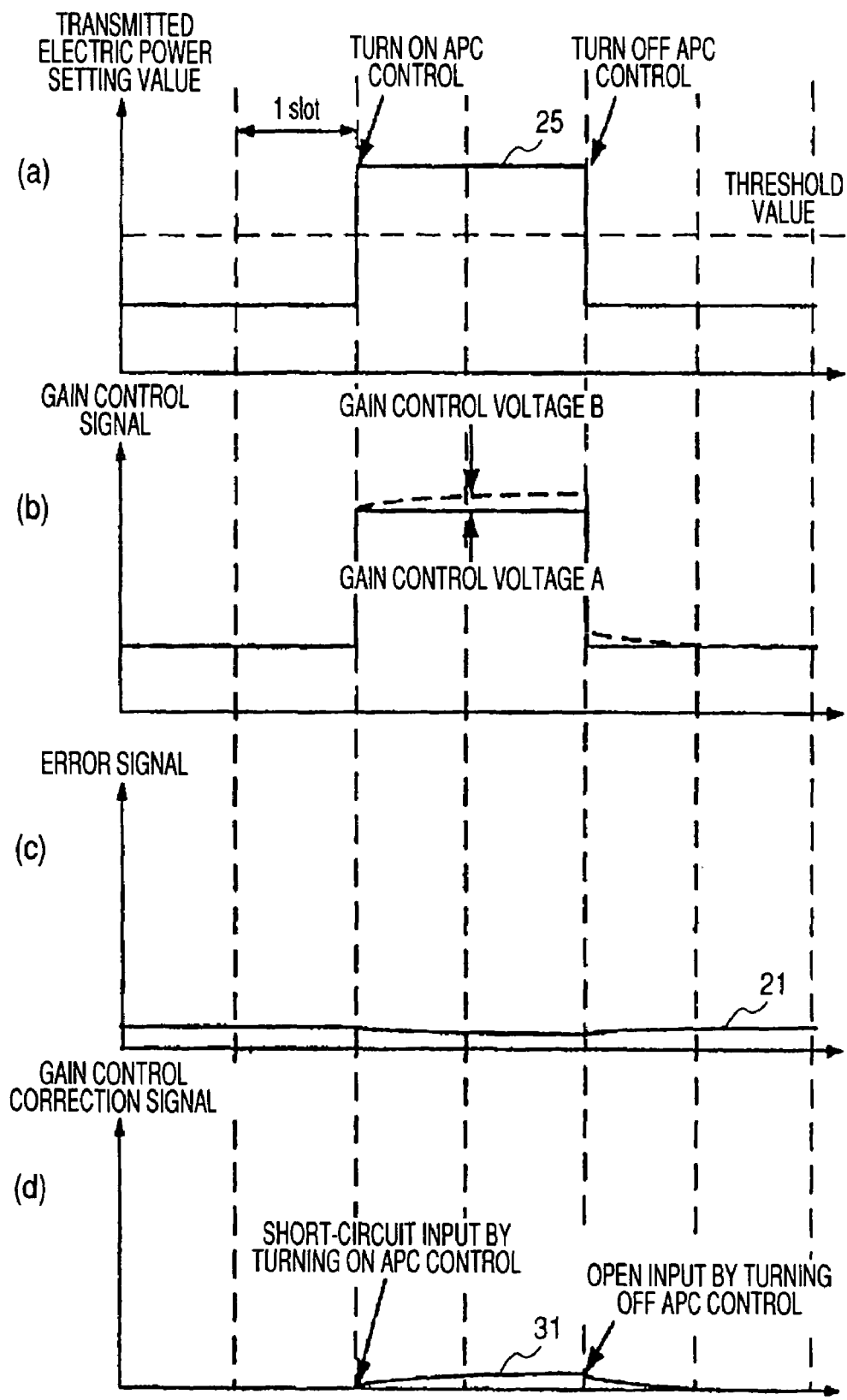
FIG. 2 is a timing chart showing a control operation of the transmitted electric power of the radio communication device shown in FIG. 1.

The error integrating part 11 inputs (short-circuit) the input signal to the error integrating part 11 in accordance with the operation control signal 22 when the transmitted electric power setting value 25 is not lower than the threshold value as shown in FIG. 2(*a*) to integrate the error (turn ON an APC control (a transmitted electric power control by a closed loop)). When the transmitted electric power setting value is not higher than the threshold value, the input signal is not inputted (opened) to the error integrating part 11 (turn OFF an APC control) and a stored integrating value is outputted to the adding part 12 as the gain control correction signal 31 that gradually changes to become zero. FIG. 2(*c*) shows the error signal 21 outputted from the error calculating part 10 at this time. FIG. 2(*d*) shows the gain correction control signal 31 outputted from the error integrating part 11 at this time. The gain correction control signal 31 gradually changes and does not abruptly change. Therefore, the gain control signal A23 outputted from the electric power value/gain control signal converting part 8 and a gain control signal B24 outputted from the adding part 12 have a relation shown in FIG. 2(*b*).

In the adding part 12, the gain control correction signal 31 is added to the gain control signal A23 to output the gain control signal B24 to the gain control terminal of the variable gain amplifier 15 of the radio transmitting part 14. Thus, the gain of the variable gain amplifier 15 is controlled so that the error signal 21 becomes zero by the gain control signal B24. Finally, the feedback control of the transmitted electric power is carried out so that the transmitted electric power outputted from the radio transmitting part 14 reaches a value set by the transmitted electric power setting value.

According to this embodiment, the transmitted electric power deciding part 7 and the error integrating part 11 are provided. Thus, in the feedback control of the transmitted electric power, even when a closed loop control that crosses the threshold value of the transmitted electric power determined by the detection limit of the detecting signal is carried out, the accumulation of the error or the discharge of the error in the error integrating part 11 is controlled by the operation control signal 22 in accordance with the decision of the threshold value in the transmitted electric power deciding part 6. Thus, not only when the transmitted electric power abruptly rises to a high value from a low value, but also when the transmitted electric power abruptly falls from the high value to the low value while the error is sufficiently accumulated, a sudden gain change is not generated in the gain control signal B24 as shown in FIG. 2(*b*). Accordingly, the transmitted electric power can be smoothly and highly accurately controlled in the closed loop.

Figure 3:
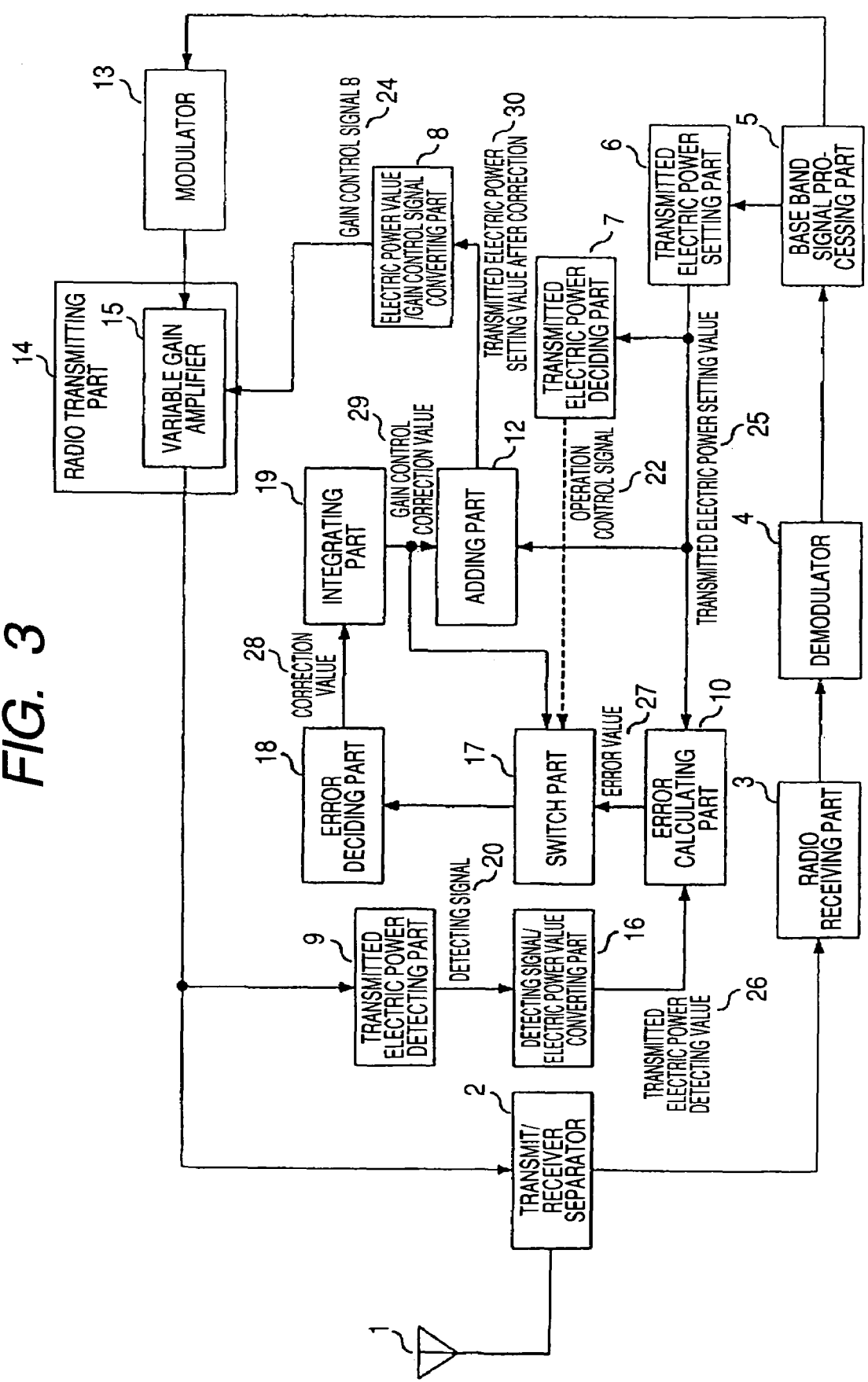
FIG. 3 is a block diagram showing a structural example of a radio communication device according to a second embodiment of the present invention.

FIG. 3 is a block diagram showing a structural example of a radio communication device according to a second embodiment of the present invention. The same parts as those of the first embodiment are designated by the same reference numerals and an explanation thereof is suitably omitted. While the radio communication device of the first embodiment mainly supposes an analog feedback control of transmitted electric power, the radio communication device of this embodiment supposes a digital feedback control of transmitted electric power. The difference of the second embodiment from the first embodiment only resides in a feedback control related to the output of a gain control signal to a variable gain amplifier 15. Other structures and an operation are the same as those of the first embodiment.

A transmitted electric power adjusting system of this embodiment includes a transmitted electric power detecting part 9 for detecting transmitted electric power radiated from an antenna 1 to output a detecting signal 20, a detecting signal/electric power value converting part 16 for converting the detecting signal 20 to a transmitted electric power detecting value 26 and outputting the transmitted electric power detecting value, an error calculating part 10 for comparing the transmitted electric power detecting value 26 with a transmitted electric power setting value 25 to calculate an error between them and output a calculated error value 27 to a switch part 17, the switch part 17 for taking the error value 27 and a gain control correction value 29 as input signals and switching which of these input signals is outputted to an error deciding part 18 by an operation control signal 22, the error deciding part 18 for deciding whether the input signal from the switch part 17 is located within a range of an allowable error or outside a range of an allowable error to output an error value 28, a transmitted electric power deciding part 7 for deciding a large or a small value relative to the threshold value of the transmitted electric power setting value 25 to output the operation control signal 22 to the switch part 17 on the basis of the decided result, an integrating part 19 for integrating the inputted correction value 28 to generate a gain control correction value 29 and output the gain control correction value 29 to an adding part 12 and the switch part 17, the adding part 12 for adding the transmitted electric power setting value 25 to the gain control correction value 29 to obtain a transmitted electric power setting value 30 after correction and output the value to an electric power value/gain control signal converting part 8 and the electric power value/gain control signal converting part 8 for converting the inputted transmitted electric power setting value 30 after correction to a gain control signal B24.

Now, an operation of the radio communication device of this embodiment will be described below. The transmitted electric power is detected by the transmitted electric power detecting part 9 to output the detecting signal 20. The detecting signal 20 is converted to the transmitted electric power detecting value 26 and the transmitted electric power detecting value is inputted to the error detecting part 10. The error detecting part 10 calculates the error between the transmitted electric power detecting value 26 and the transmitted electric power setting value 25 and outputs the error value 27 to the switch part 17.

The switch part 17 takes the error value 27 and the gain control correction value 29 as the input signals. The switch part 17 receives the operation control signal 22 from the transmitted electric power deciding part 7. When the transmitted electric power setting value 25 is not lower than the threshold value, the switch part outputs the error value 27 to the error deciding part 18. When the transmitted electric power setting value 25 is not higher than the threshold value, the switch part outputs the gain control correction value 29 to the error deciding part 18. The error deciding part 18 decides an input value form the switch part 17. When the input value is located outside the range of the allowable error, the error deciding part 18 outputs the correction value 28 of an opposite polarity to the input value. When the input value is located within the range of the allowable error, the error deciding part 18 outputs 0. The adding part 12 adds the gain control correction value 28 outputted from the integrating part 19 to the transmitted electric power setting value 25 to output the transmitted electric power setting value 30 after correction to the electric power value/gain control signal converting part 8. The electric power value/gain control signal converting part 8 converts the transmitted electric power setting value 30 after correction to the gain control signal B24. Thus, the variable gain amplifier 15 is controlled to perform the feedback control of the transmitted electric power so as to have the error value of zero.

Figure 4:
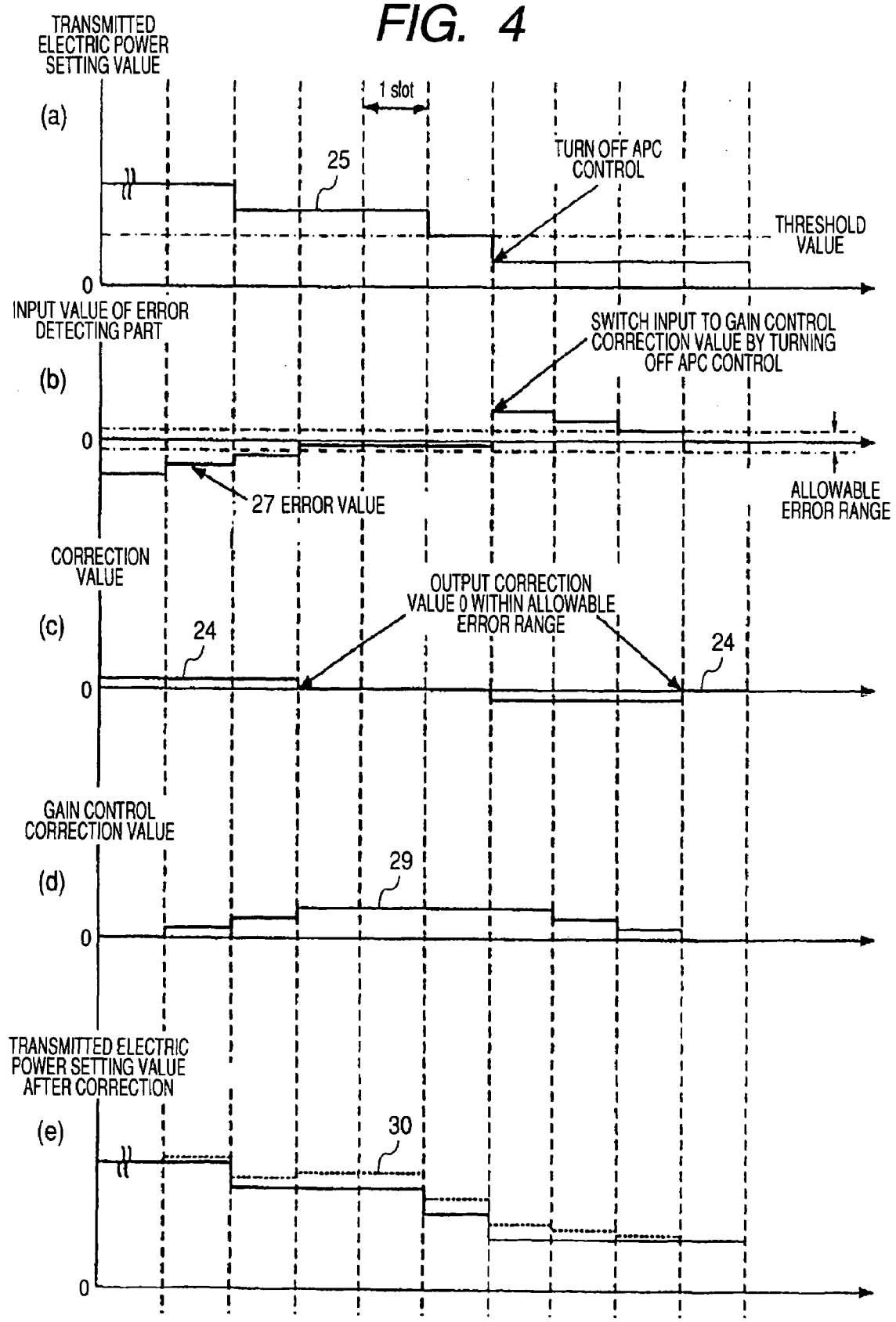
FIG. 4 is a timing chart showing a control operation of the transmitted electric power of the radio communication device shown in FIG. 3.

The above-described operation will be specifically described with reference to FIG. 4 by way of an example that the transmitted electric power is lower than the transmitted electric power setting value 25. As shown in FIG. 4(*a*), when the transmitted electric power setting value 25 is not lower than the threshold value, the error value 27 is inputted to the error deciding part 18, so that the error deciding part 18 outputs the correction value 24 of an opposite polarity (positive) to the error value 27 to the integrating part 19 as shown in FIG. 4(*c*). The correction value 24 is integrated by the integrating part 19 and the gain control correction value 29 is increased as shown in FIG. 4(*d*). Thus, the transmitted electric power setting value 30 after correction is increased as shown by oblique lines in FIG. 4(*e*) to increase the transmitted electric power and the error value 27 is decreased as shown in FIG. 4(*b*). When the error value 27 is decreased to be located within the range of the allowable error, the correction value 24 becomes 0 as shown in FIG. 4(*c*). Thus, the integration of the integrating part 19 is stopped and the gain control correction value 29 is held in the integrating part 19.

Then, as shown in FIG. 4(*a*), when the transmitted electric power setting value 25 is decreased to reach a value not higher than the threshold value (turn OFF an APC control), the switch part 17 is switched and the gain control correction value 29 is inputted to the error deciding part 18 as shown in FIG. 4(*b*). In this case, the error deciding part 18 outputs the correction value 24 of an opposite polarity (negative) to the gain control correction value 29 as shown in FIG. 4(*c*), so that the gain control correction value 29 outputted from the integrating part 19 decreases as shown in FIG. 4(*d*). Then, when the gain control correction value 29 is located within the range of the allowable error, the correction value becomes 0 as shown in FIG. 4(*c*) and the gain control correction value 29 is held in the integrating part 19 as shown in FIG. 4(*d*).

According to this embodiment, the transmitted electric power deciding part 7, the switch part 17, the error deciding part 18, the integrating part 19, the transmitted electric power deciding part 7 and an error integrating part 11 are provided. Thus, in the feedback control of the transmitted electric power, even when a closed loop control that crosses the threshold value of the transmitted electric power determined by the detection limit of the detecting signal 20 is carried out, a sudden gain change is not generated in the gain control signal B24 as shown in FIG. 4(*e*) like the first embodiment. Accordingly, the transmitted electric power can be smoothly and highly accurately controlled in the closed loop and the same effect can be obtained.

Figure 5:
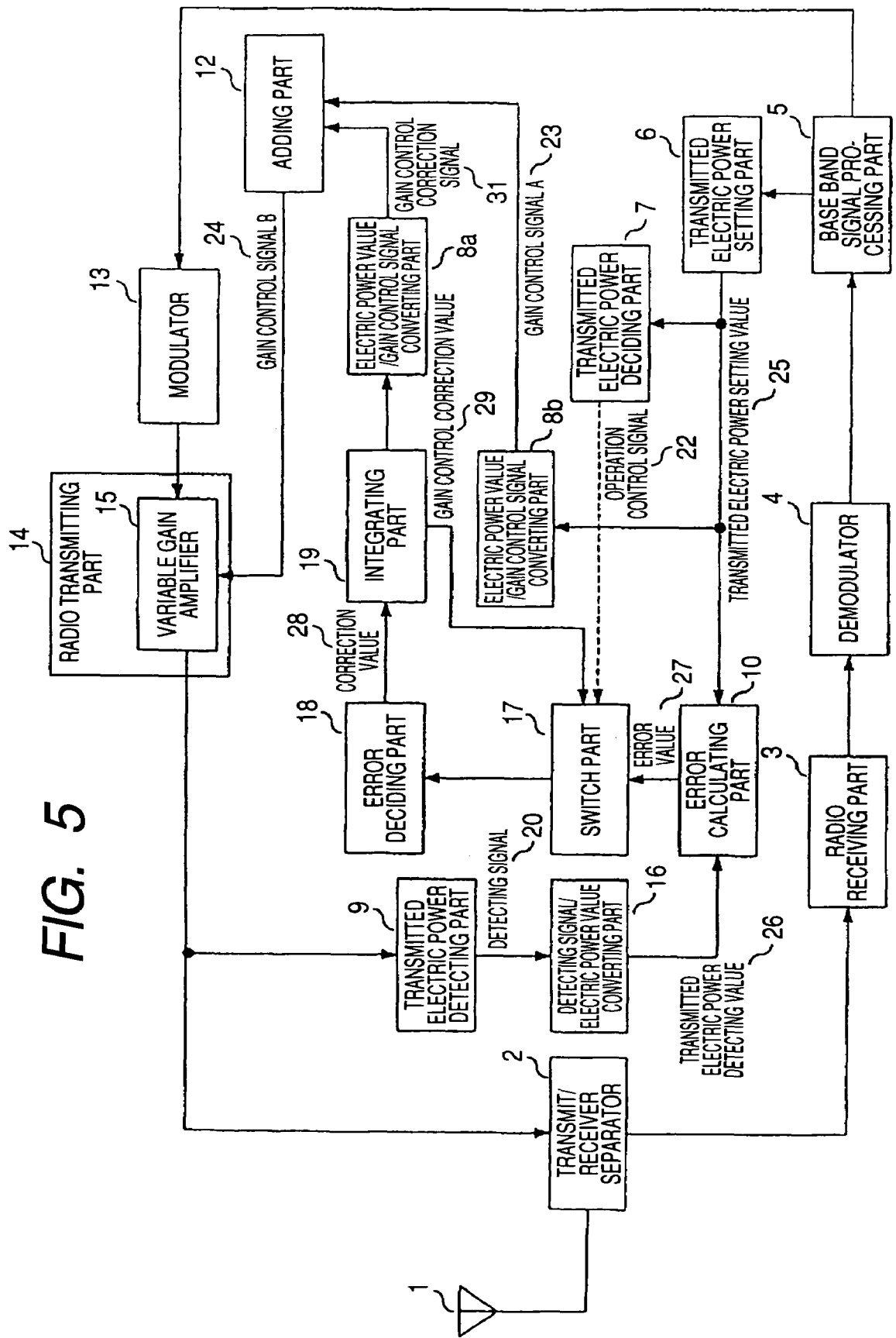
FIG. 5 is a block diagram showing a structural example of a radio communication device according to a third embodiment of the present invention.

FIG. 5 is a block diagram showing a structural example of a radio communication device according a third embodiment of the present invention. The same parts as those of the second embodiment are designated by the same reference numerals and an explanation thereof is suitably omitted. The radio communication device of this embodiment supposes a digital feedback control of transmitted electric power like the second embodiment.

In the second embodiment, the gain control correction value 29 is added to the transmitted electric power setting value 25, and then, the transmitted electric power setting value after correction is converted to the gain control signal B24 by the electric power value/gain control signal converting part 8. On the other hand, in this embodiment, electric power value/gain control signal converting parts 8*a* and 8*b* for respectively converting a gain control correction value 29 and a transmitted electric power setting value 25 are provided to output a gain control signal B24 by adding the converted signals. Other structures and an operation are the same as those of the second embodiment.

While the gain control correction value 29 is added to the transmitted power setting value 25 and then the transmitted electric power setting value after correction is converted to the gain control signal B24 by the electric power value/gain control signal converting part 8 in the second embodiment, in the radio communication device of this embodiment, the electric power value/gain control signal converting parts 8*a* and 8*b* are respectively provided for converting the gain control correction value 29 and the transmitted electric power setting value 25. Thus, a converted gain control correction signal is added to a gain control signal A23 to output a gain control signal B24. Other structure and an operation are the same as those of the second embodiment.

To provide an output range necessary for controlling the variable gain amplifier 15 and a resolution necessary for adjusting an error in one electric power value/gain control signal converting part 8 as in the second embodiment, a very large circuit structure is required. However, according to this embodiment, the electric power value/gain control signal converting parts 8*a* and 8*b* are provided respectively in the gain control correction value 29 and the transmitted electric power setting value 25. Thus, suitable output ranges and resolutions are provided in the electric power value/gain control signal converting parts 8*a* and 8*b* for respectively converting the gain control correction value 29 and the transmitted electric power setting value 25. Accordingly, the circuit structure can be reduced. Other effects are the same as those of the second embodiment.

Figure 6:
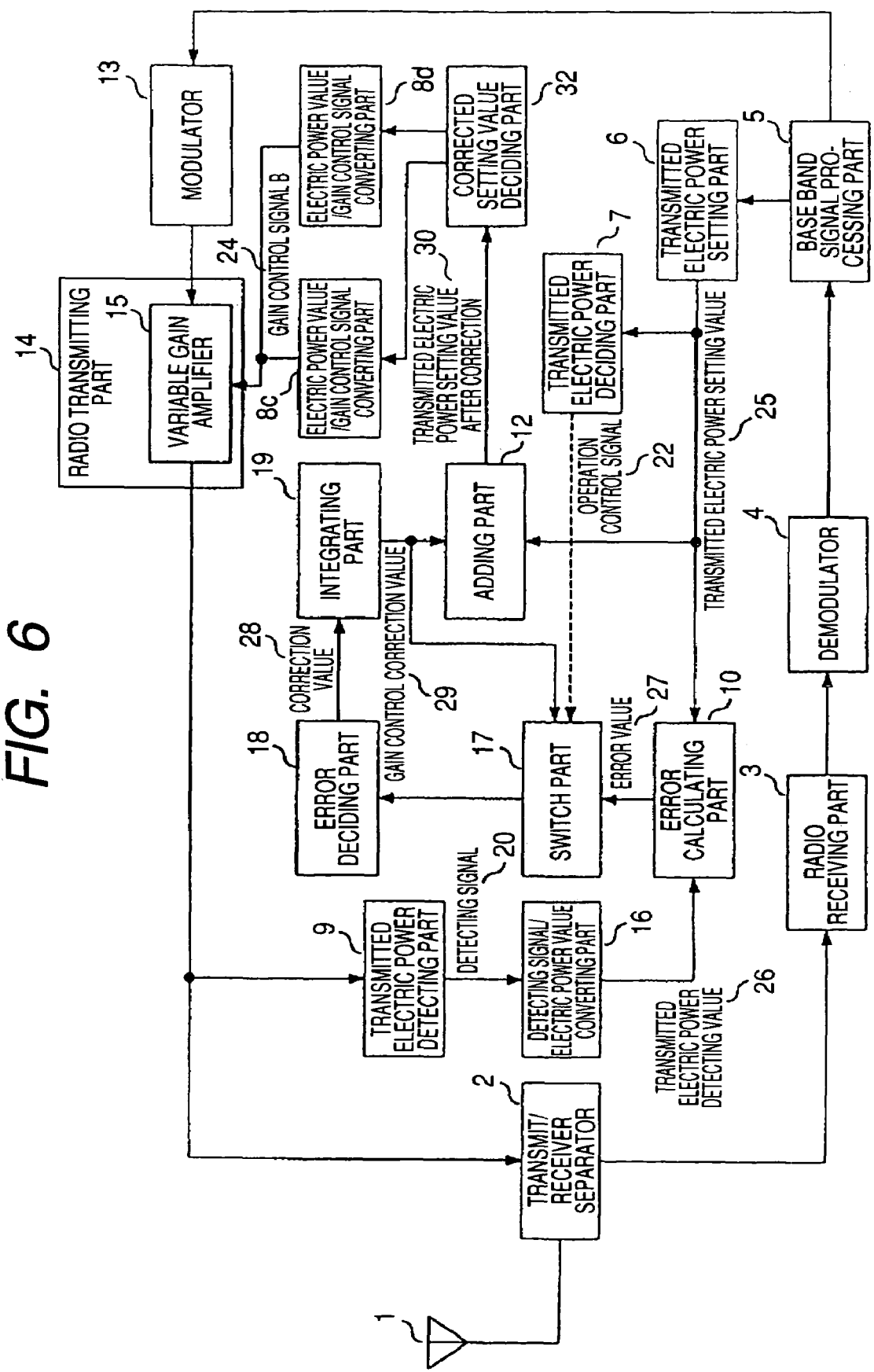
FIG. 6 is a block diagram showing a structural example of a radio communication device according to a fourth embodiment of the present invention.
Figure 7:
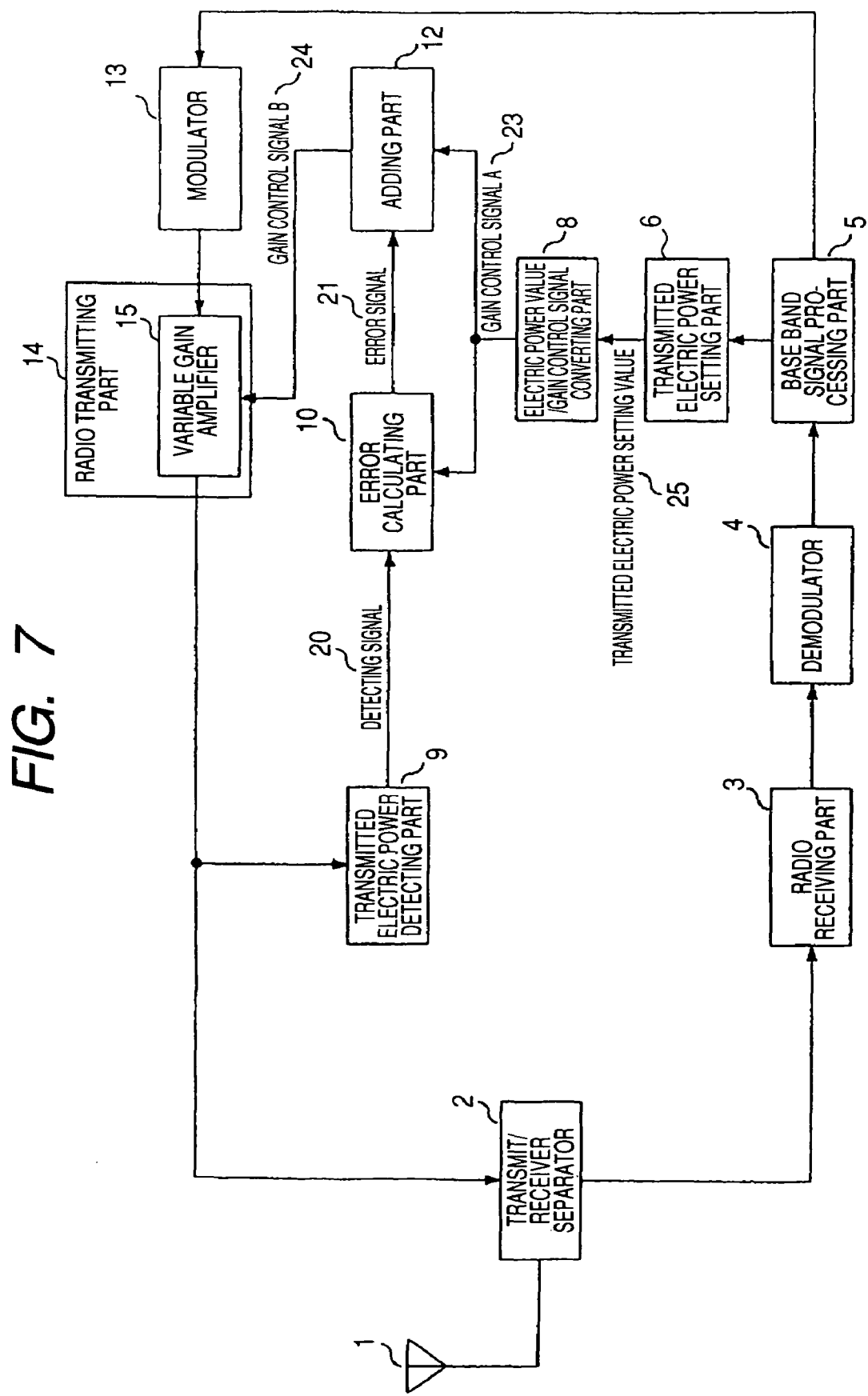
FIG. 7 is a block diagram showing a structural example of a usual radio communication device.
Figure 8:
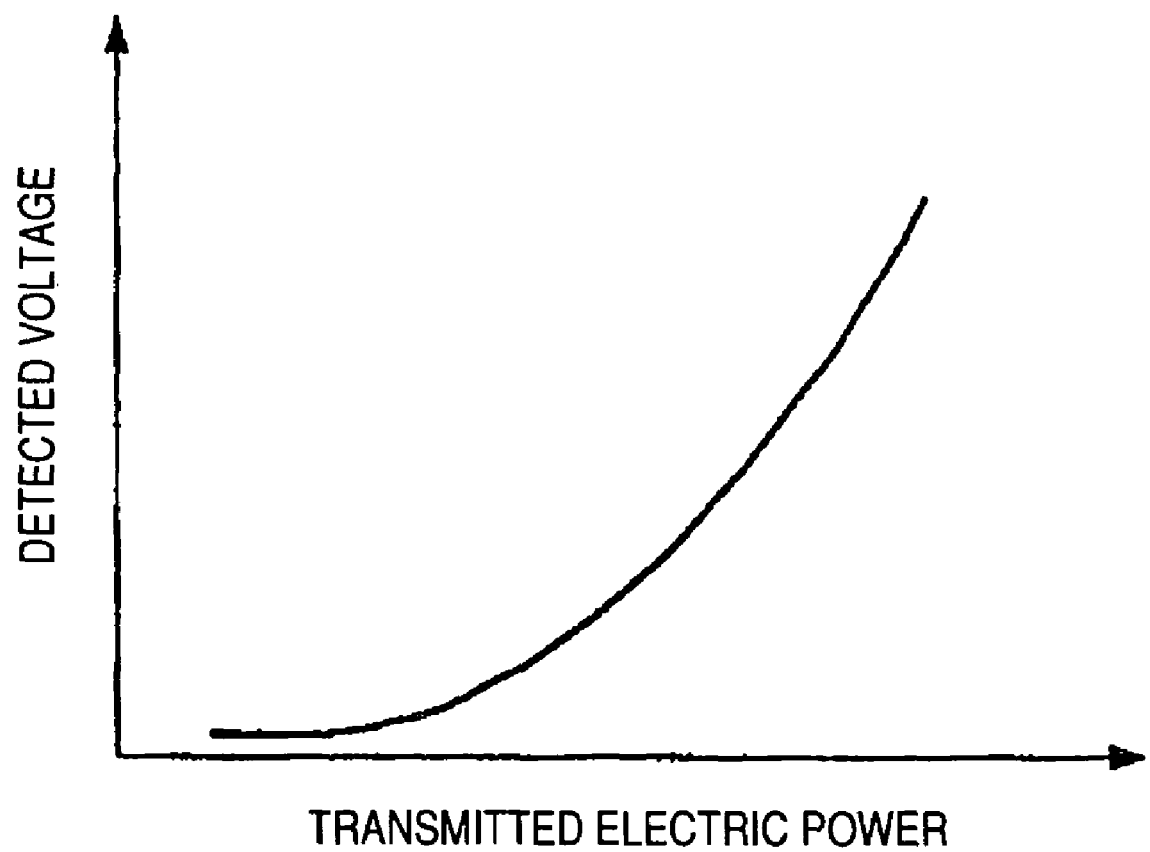
FIG. 8 is a characteristic view showing the detecting characteristics of a usual transmitted electric power detecting part.

FIG. 6 is a block diagram showing a structural example of a radio communication device according a fourth embodiment of the present invention. The same parts as those of the second embodiment are designated by the same reference numerals and an explanation thereof is suitably omitted.

The radio communication device of this embodiment supposes a digital feedback control of transmitted electric power like the second embodiment. In the second embodiment, the transmitted electric power setting value 30 after correction is converted to the gain control signal B24 by one electric power value/gain control signal converting part 8. On the other hand, in the radio communication device of this embodiment, a corrected setting value deciding part 32 is provided. Further, the output destination of a transmitted electric power setting value 30 after correction is switched to either of an electric power value/gain control signal converting part 8c having a narrow output range and a high resolution and an electric power value/gain control signal converting part 8d having a wide output range and a low resolution in accordance with set electric power by the corrected setting value deciding part 32. That is, when the set electric power is low, the electric power value/gain control signal converting part 8d having the wide output range and the low resolution is used. When the set electric power is high, the electric power value/gain control signal converting part 8c having the narrow output range and the high resolution is used. Other structures and an operation are the same as those of the second embodiment.

To provide an output range necessary for controlling the variable gain amplifier 15 and a resolution necessary for adjusting an error in one electric power value/gain control signal converting part 8 as in the second embodiment, a very large circuit structure is required. However, according to this embodiment, the transmitted electric power setting value 30 after correction is converted to the gain control signal B24 by either of the electric power value/gain control signal converting parts 8c and 8d in accordance with the level of the set electric power by the corrected setting value deciding part 32. Accordingly, the circuit structure can be reduced. Other effects are the same as those of the second embodiment.

In the above explanation, an example that the electric power value/gain control signal converting part 8 includes two electric power value/gain control signal converting parts is shown. However, the electric power value/gain control signal converting part 8 composed of three or more electric power value/gain control signal converting parts may be likewise put into practice with the same effects.

Further, the present invention is not limited to the above-described embodiments and may be put into practice by other various kinds of forms in view of specific structure, function, operation and effect without departing the gist of the invention. For instance, when transmitted electric power is not controlled in a closed loop by an operation control signal of a transmitted electric power deciding part 7, the operations of a transmitted electric power detecting part 9, an error calculating part 10 (or a detecting signal/electric power value converting part 16) are turned off so that consumed electric power can be reduced. Further, the output timing of the operation control signal of the transmitted electric power deciding part 7 is changed to operate an error integrating part 11 after the operations of other blocks are stabilized. The output update cycle of the decided result of the transmitted electric power deciding part 7 is switched to select a function meeting the system of the TDMA (Time Division Multiple Access) system as well as the CDMA system. A threshold value is switched in the transmitted electric power deciding part 7, so that a range for controlling the transmitted electric power can be changed. The electric power value/gain control converting parts 8, 8a and 8b are provided with ramping output functions to meet the systems such as the TDMA system. The validity and invalidity of the ramping output functions of the electric power value/gain control converting parts 8, 8a and 8b can be selected to select a function meeting the system of the TDMA system as well as the CDMA system. The output value of a correction value of an error deciding part 18 is changed to switch an amount of correction per slot. The tolerance of the error deciding part 18 is switched to change a control range of transmitted electric power. The output update cycle of the correction value of the error deciding part 18 is switched to select a function meeting the system of the TDMA system as well as the CDMA system. The output update cycle of the error calculating part 18 is switched to select a function meeting the output of an error and the system of the TDMA system as well as the CDMA system. A threshold value for deciding a level for deciding a large value or a small value of the transmitted electric power of the corrected setting value deciding part 32 is switched to change the control range of the transmitted electric power after correction. The output update cycle of the decided result of the corrected setting value deciding part 32 is switched to select a function meeting the system of the TDMA system as well as the CDMA system.

Although the present invention is specifically described with reference to the specific embodiments, it is apparent for a person with ordinary skill in the art that various changes or modification may be made without departing the spirit and scope of the present invention.

This application is based on Japanese Patent Application No. 2002-377204 filed in Dec. 26, 2002 and the contents thereof are taken in as a reference.

INDUSTRIAL APPLICABILITY

As described above, according to the invention defined in claim 1, the buffer unit is provided. Thus, when the closed loop control that crosses the threshold value as the detection limit of the transmitted electric power is carried out, even if the transmitted electric power changes to cross the threshold value, an abrupt gain change can be suppressed and the transmitted electric power can be smoothly and highly accurately controlled.

According to the invention defined in claim 2, the transmitted electric power deciding part and the error integrating part are provided. Thus, when the closed loop control that crosses the threshold value as the detection limit of the transmitted electric power is carried out, even if the transmitted electric power greatly changes, an abrupt gain change can be suppressed and the transmitted electric power can be smoothly and highly accurately controlled.

According to the invention defined in claim 3, the switch part, the error deciding part, the integrating part and the transmitted electric power deciding part are provided. Thus, when the closed loop control that crosses the threshold value as the detection limit of the transmitted electric power is carried out, even if the transmitted electric power greatly changes, an abrupt gain change can be suppressed and the transmitted electric power can be smoothly and highly accurately controlled.

According to the invention defined in claim 4, the switch part, the error deciding part, the integrating part and the transmitted electric power deciding part are provided. The gain control correction value outputted from the integrating part and the set electric power are respectively converted to the gain control correction signal and the gain control signal by the separate electric power value/gain control signal converting parts. Thus, when the closed loop control that crosses the threshold value as the detection limit of the transmitted electric power is carried out, even if the transmitted electric power greatly changes, an abrupt gain change can be suppressed and the transmitted electric power can be smoothly and highly accurately controlled. Further, the above-described effects can be obtained without enlarging the circuit structure.

According to the invention defined in claim 5, the switch part, the error deciding part, the integrating part and the transmitted electric power deciding part are provided. The gain control signal for controlling the variable gain amplifier is obtained by a plurality of electric power value/gain control signal converting parts corresponding to the level of the set electric power. Thus, when the closed loop control that crosses the threshold value as the detection limit of the transmitted electric power is carried out, even if the transmitted electric power greatly changes, an abrupt gain change can be suppressed and the transmitted electric power can be smoothly and highly accurately controlled. Further, the above-described effects can be obtained without enlarging the circuit structure.

According to the invention defined in claim 6, when the transmitted electric power is not controlled in a closed loop, the transmitted electric power detecting part or the error calculating part is tuned off so that consumed electric power can be reduced.

According to the invention defined in claim 7, the output timing of the decided result of the transmitted electric power deciding part is changed to operate the error integrating part after the operations of other blocks are stabilized.

According to the invention defined in claim 8, the output update cycle of the decided result of the transmitted electric power deciding part is switched to select a function meeting the system of the TDMA system as well as the CDMA system.

According to the invention defined in claim 9, a threshold value is switched in the transmitted electric power deciding part, so that a range for controlling the transmitted electric power can be changed.

According to the invention defined in claim 10, the electric power value/gain control converting parts are provided with ramping output functions to meet the systems such as the TDMA system.

According to the invention defined in claim 11, the validity and invalidity of the ramping output functions of the electric power value/gain control converting parts can be selected to select a function meeting the system of the TDMA system as well as the CDMA system.

According to the invention defined in claim 12, the output value of the correction value of the error deciding part is changed to switch an amount of correction per slot.

According to the invention defined in claim 13, the tolerance of the error deciding part is switched to change a control range of the transmitted electric power.

According to the invention defined in claim 14, the output update cycle of the correction value of the error deciding part is switched to select a function meeting the system of the TDMA system as well as the CDMA system.

According to the invention defined in claim 15, the output update cycle of the error calculating part is switched to select a function meeting the output of an error and the system of the TDMA system as well as the CDMA system.

According to the invention defined in claim 16, a threshold value for deciding a level for judging a large value or a small value of the transmitted electric power of the corrected setting value deciding part is switched to change the control range of the transmitted electric power after correction.

According to the invention defined in claim 17, the output update cycle of the decided result of the corrected setting value deciding part is switched to select a function meeting the system of the TDMA system as well as the CDMA system.

The invention claimed is:

1. A radio communication device for communicating with an other station, said communication device comprising:
 a variable gain amplifier for outputting a transmitted electric power;
 a transmitted electric power setting part for receiving a transmitted electric power control bit sent from the other station, said setting part utilizing said bit for setting a set transmitted electric power;
 a transmitted electric power detecting part for detecting the transmitted electric power of the communication device;
 an error calculating part for obtaining an error between the detected transmitted electric power of the communication device and the set transmitted electric power value; and
 a buffer unit for receiving said error and said transmitted electric power setting value and for outputting a correction signal used for correcting the gain of the variable gain amplifier for smoothly changing the gain when the set transmitted electric power is set to put the transmitted electric power over a threshold value.

2. A radio communication device for communicating with an other station, said communication device comprising:
 a variable gain amplifier for outputting a transmitted electric power;
 a transmitted electric power setting part for receiving a transmitted electric power control bit sent from the other station, said setting part utilizing said bit for setting a set transmitted electric power;
 an electric power value/gain control signal converting part for converting the set transmitted electric power to a gain control signal of a form for controlling the gain of the variable gain amplifier;
 a transmitted electric power detecting part for detecting the transmitted electric power of the communication device;
 an error calculating part for comparing the detected transmitted electric power with the gain control signal to calculate an error;
 a transmitted electric power deciding part for whether the set transmitted electric power is above or below a threshold value;
 an error integrating part that determines whether the calculated error is integrated in accordance with the decided result of whether the set transmitted electric power is above or below the threshold value; and
 an adding part for adding the integrated result to the gain control signal for obtaining a result for controlling the gain of the variable gain amplifier.

3. A radio communication device in which transmitted electric power is set in accordance with a transmitted electric power control bit sent to the device from an other station and the gain of a variable gain amplifier of a transmitting system is controlled so as to obtain the set transmitted electric power, characterized in that the radio communication device comprises:
 a transmitted electric power detecting part for detecting the transmitted electric power of the device;
 an error calculating part for comparing the value of the detected transmitted electric power with the set transmitted electric power to calculate an error;
 a transmitted electric power deciding part for deciding whether the set transmitted electric power is above or below a threshold value;
 a switch part for selecting and outputting any one of the calculated error and a gain control correction value in accordance with the decided result of whether the set transmitted electric power is above or below the threshold value;

an error deciding part for deciding whether or not an input signal from the switch part is located within a tolerance to output a correction value corresponding to the decided result;

an integrating part for integrating the outputted correction value and outputting an integrated result as the gain control correction value;

an adding part for adding the set transmitted electric power to the gain control correction value; and an electric power value/gain control signal converting part for converting the added result to a gain control signal of a form for controlling the gain of the variable gain amplifier and outputting the gain control signal to the variable gain amplifier.

4. A radio communication device in which transmitted electric power is set in accordance with a transmitted electric power control bit sent to the device from an other station and the gain of a variable gain amplifier of a transmitting system is controlled so as to obtain the set transmitted electric power, characterized in that the radio communication device comprises:

a transmitted electric power detecting part for detecting the transmitted electric power of the device;

an error calculating part for comparing the value of the detected transmitted electric power with the set transmitted electric power to calculate an error;

a transmitted electric power deciding part for deciding whether the set transmitted electric power is above or below the threshold value;

a switch part for selecting and outputting any one of the calculated error and a gain control correction value in accordance with the decided result of whether the set transmitted electric power is above or below the threshold value;

an error deciding part for deciding whether or not an input signal from the switch part is located within a tolerance to output a correction value corresponding to the decided result;

an integrating part for integrating the outputted correction value to output the gain control correction value;

a first electric power value/gain control signal converting part for converting the gain control correction value to a gain control correction signal of a form for controlling the gain of the variable gain amplifier;

a second electric power value/gain control signal converting part for converting the set transmitted electric power to a gain control signal of a form for controlling the gain of the variable gain amplifier; and an adding part for adding the gain control signal to the gain control correction signal and controlling the gain of the variable gain amplifier by an obtained adding signal.

5. A radio communication device in which transmitted electric power is set in accordance with a transmitted electric power control bit sent to the device from an other station and the gain of a variable gain amplifier of a transmitting system is controlled so as to obtain the set transmitted electric power, characterized in that the radio communication device comprises:

a transmitted electric power detecting part for detecting the transmitted electric power of the device;

an error calculating part for comparing the value of the detected transmitted electric power with the set transmitted electric power to calculate an error;

a transmitted electric power deciding part for deciding whether the set transmitted electric power is above or below a threshold value;

a switch part for selecting and outputting any one of the calculated error and a gain control correction value in accordance with the decided result of whether the set transmitted electric power is above or below the threshold value;

an error deciding part for deciding whether or not an input signal from the switch part is located within a tolerance and outputting a correction value corresponding to the decided result;

an integrating part for integrating the outputted correction value to output the gain control correction value;

an adding part for adding the set transmitted electric power to the gain control correction value;

first and second electric power value/gain control signal converting parts for converting the added result to a gain control signal for controlling the gain of the variable gain amplifier; and a set value deciding part after correction for deciding by which of the first and second electric value/gain control signal converting parts the added result is converted to the gain control signal in accordance with the decided result of whether the set transmitted electric power is above or below the threshold value.

6. A radio communication device according to any one of claims 2 to 5, wherein an on/off control of the transmitted electric power detecting part or the error calculating part is carried out in accordance with the decided result of whether the set transmitted electric power is above or below the threshold value.

7. A radio communication device according to any one of claims 1 to 5, wherein the transmitted electric power deciding part can change an output timing of the decided result.

8. A radio communication device according to any one of claims 1 to 5, wherein the transmitted electric power deciding part can change an output update cycle of the decided result.

9. A radio communication device according to any one of claims 1 to 5, wherein the transmitted electric power deciding part can change the threshold value.

10. A radio communication device according to any one of claims 2 to 5, wherein the electric power value/gain control signal converting part has a ramping output function to the gain control signal.

11. A radio communication device according to any one of claims 2 to 5, wherein the electric power value/gain control signal converting part can select a presence or absence of a ramping output to the gain control signal.

12. A radio communication device according to any one of claims 3 to 5, wherein the error deciding part changes the output value of the correction value.

13. A radio communication device according to any one of claims 3 to 5, wherein the error deciding part can change the tolerance.

14. A radio communication device according to any one of claims 3 to 5, wherein the error deciding part can change an output update cycle of the correction value.

15. A radio communication device according to any one of claims 2 to 5, wherein the error calculating part can change an output update cycle of the error.

16. A radio communication device according to claim 5, wherein the set value deciding part after correction can change the threshold for deciding the level of the set transmitted electric power.

17. A radio communication device according to claim 5, wherein the set value deciding part after correction can change an output update cycle of the decided result.

18. A radio communication device for communicating with an other station said communication device comprising:
- a variable gain amplifier for outputting a transmitted electric power;
- a transmitted electric power setting part for receiving a transmitted electric power control bit sent from the other station, said setting part utilizing said bit for setting a set transmitted electric power;
- a transmitted electric power detecting part for detecting the transmitted electric power of the communication device;
- an error calculating part for comparing the value of the detected transmitted electric power with the set transmitted electric power to calculate an error;
- a transmitted electric power deciding part for deciding whether the set transmitted electric power is above or below a threshold value;
- a switch part for selecting and outputting any one of the calculated error and a gain control correction value in accordance with the decided result of whether the set transmitted electric power is above or below the threshold value;
- an error deciding part for deciding whether an input signal from the switch part is located within a tolerance for deciding whether to output a correction value corresponding to whether the input signal is located within the tolerance;
- an integrating part for integrating the outputted correction value and outputting an integrated result as a gain control correction value;
- an adding part for adding the set transmitted electric power to the gain control correction value; and
- an electric power value/gain control signal converting part for converting the added result to a gain control signal of a form for controlling the gain of the variable gain amplifier and for outputting the gain control signal to the variable gain amplifier.

19. A radio communication device for communicating with an other station said communication device comprising:
- a variable gain amplifier for outputting a transmitted electric power;
- a transmitted electric power setting part for receiving a transmitted electric power control bit sent from the other station, said setting part utilizing said bit for setting a set transmitted electric power;
- a transmitted electric power detecting part for detecting the transmitted electric power of the communication device;
- an error calculating part for comparing the value of the detected transmitted electric power with the set transmitted electric power to calculate an error;
- a transmitted electric power deciding part for deciding whether the set transmitted electric power is above or below a threshold value;
- a switch part for selecting and outputting any one of the calculated error and a gain control correction value in accordance with the decided result of whether the set transmitted electric power is above or below the threshold value;
- an error deciding part for deciding whether an input signal from the switch part is located within a tolerance for deciding whether to output a correction value corresponding to the decided result of whether the input signal is located within the tolerance;
- an integrating part for integrating the outputted correction value to output a gain control correction value;
- a first electric power value/gain control signal converting part for converting the gain control correction value to a gain control correction signal of a form for controlling the gain of the variable gain amplifier;
- a second electric power value/gain control signal converting part for converting the set transmitted electric power to a gain control signal of a form for controlling the gain of the variable gain amplifier; and
- an adding part for adding the gain control signal to the gain control correction signal and for obtaining a result for controlling the gain of the variable gain amplifier.

20. A radio communication device for communicating with an other station said communication device comprising:
- a variable gain amplifier for outputting a transmitted electric power;
- a transmitted electric power setting part for receiving a transmitted electric power control bit sent from the other station, said setting part utilizing said bit for setting a set transmitted electric power;
- a transmitted electric power detecting part for detecting the transmitted electric power of the communication device;
- an error calculating part for comparing the value of the detected transmitted electric power with the set transmitted electric power to calculate an error;
- a transmitted electric power deciding part for deciding whether the set transmitted electric power is above or below a threshold value;
- a switch part for selecting and outputting any one of the calculated error and a gain control correction value in accordance with the decided result of whether the set transmitted electric power is above or below the threshold value;
- an error deciding part for deciding whether an input signal from the switch part is located within a tolerance and for outputting a correction value corresponding to whether the input signal is within the tolerance;
- an integrating part for integrating the outputted correction value to output a gain control correction value;
- an adding part for adding the set transmitted electric power to the gain control correction value;
- first and second electric power value/gain control signal converting parts for converting the added result to a gain control signal for controlling the gain of the variable gain amplifier; and
- a set value deciding part after correction for deciding by which of the first and second electric value/gain control signal converting parts the added result is converted to the gain control signal in accordance with the decided result of whether the set transmitted electric power is above or below the threshold value.

* * * * *